(12) United States Patent
Brown et al.

(10) Patent No.: US 6,960,304 B1
(45) Date of Patent: Nov. 1, 2005

(54) WASTEWATER TREATMENT

(75) Inventors: David W. Brown, Ambler, PA (US); Kenneth Breindel, Lansdale, PA (US); Ronald W. Broadbent, Horsham, PA (US); Michael S. Wiggins, Lansdale, PA (US)

(73) Assignee: Cognis Corporation, Ambler, PA (US)

(*) Notice: Subject to any disclaimer, the term of this patent is extended or adjusted under 35 U.S.C. 154(b) by 163 days.

(21) Appl. No.: 10/610,892

(22) Filed: Jul. 1, 2003

Related U.S. Application Data

(60) Provisional application No. 60/396,687, filed on Jul. 18, 2002.

(51) Int. Cl.$^7$ ............................................. C02F 1/00
(52) U.S. Cl. ...................... 210/749; 252/180; 524/319; 524/339
(58) Field of Search ..................... 210/749; 252/180; 524/319, 339

(56) References Cited

U.S. PATENT DOCUMENTS

| | | | | |
|---|---|---|---|---|
| 5,108,655 A | * | 4/1992 | Johns et al. | 516/115 |
| 5,827,453 A | * | 10/1998 | Gross et al. | 516/134 |
| 6,512,016 B2 | * | 1/2003 | Khan et al. | 516/123 |
| 2001/0031813 A1 | * | 10/2001 | Breindel et al. | 524/319 |

* cited by examiner

*Primary Examiner*—Betsey Morrison Hoey
(74) *Attorney, Agent, or Firm*—John F. Daniels; Arthur G. Seifert

(57) ABSTRACT

Methods for treating wastewater comprising adding to wastewater a defoaming and/or surfactant-effective quantity of at least one base-catalyzed branched reaction product comprising the following reactants:

A) at least one compound of formula I $$R^1(X)_3 \quad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula II $$R^2X(AO)_nY \quad (II)$$

wherein $R^2$ is a substituted or unsubstituted, saturated or unsaturated, organic group having from 1 to 36 carbon atoms; X is —O—, —S—, or —NR$^3$— where $R^3$ is hydrogen or a $C_1$–$C_{18}$ alkyl group; each AO group is independently an ethyleneoxy, 1,2-propyleneoxy, or 1,2-butyleneoxy group, n is a number of from 0 to 200; and Y is hydrogen, or Y can be a mercapto group or an amino group or a $C_1$–$C_6$ alkylamino group in place of a terminal —OH group, provided that when Y is mercapto or an amino group or a $C_1$–$C_6$ alkylamino group, n is at least 1;

wherein the mole ratio of the linking compound a) to b) is from 0.1:1 to 5:1; and to wastewaters containing the above base-catalyzed reaction products.

40 Claims, No Drawings

WASTEWATER TREATMENT

CROSS REFERENCE TO RELATED APPLICATIONS

This application claims the benefit of copending provisional application Ser. No. 60/396,687, filed on Jul. 18, 2002.

FIELD OF THE INVENTION

This invention relates to methods for treating wastewater.

SUMMARY OF THE INVENTION

This invention relates to methods for treating wastewater by adding thereto a low foaming surfactant which effectively defoams the foam that frequently is present in wastewater, particularly in flowing wastewater, and to the wastewater compositions containing the low-foaming surfactants.

The low foaming surfactants that are used in the practice of the invention are branched reaction products comprising the following reactants:

a) at least one compound of formula I $$R^1(X)_3 \tag{I}$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and b) at least one compound having the formula II $$R^2X(AO)_nY \tag{II}$$

wherein $R^2$ is a substituted or unsubstituted, saturated or unsaturated, organic group having from 1 to 36 carbon atoms; X is —O—, —S—, or —NR$^3$— where $R^3$ is hydrogen or a $C_1$–$C_{18}$ alkyl group; each AO group is independently an ethyleneoxy, 1,2-propyleneoxy, or 1,2-butyleneoxy group, n is a number of from 0 to 200, preferably from 1 to 100, more preferably from 2 to 20; and Y is hydrogen, or Y can be a mercapto group or an amino group (amino or $C_1$–$C_6$ alkylamino group) in place of a terminal —OH group, provided that when Y is mercapto or an amino group or a $C_1$–$C_6$ alkylamino group, n is at least 1;

wherein the mole ratio of the linking compound a) to b) is from 0.1:1 to 5:1, preferably from 0.6:1 to 2:1, more preferably from 1.0:1 to 2:1, and most preferably from 0.8:1 to 1.5:1.

The presence of the low foaming surfactants in the wastewater effectively defoam the wastewater, making it much easier to process. Moreover, the low foaming surfactants are stable under a wide range of pH and temperature conditions including highly acidic wastewaters. This stability under highly acidic conditions is not a property shared by many other surfactants and defoaming agents.

DETAILED DESCRIPTION OF THE INVENTION

Other than in the operating examples, or where otherwise indicated, all numbers expressing quantities of ingredients or reaction conditions used herein are to be understood as modified in all instances by the term "about".

The low foaming surfactants used in the methods of the invention are added to wastewater in a defoaming-effective amount, which is usually in the range of from 0.001 to 5% by weight of the wastewater, preferably from 0.1 to 3% by weight.

In the low foaming surfactants, component a) is preferably epichlorohydrin or another epihalohydrin. However, trihaloalkanes can be used, such as 1,2,3-trichloropropane, 1,2,4-trichlorobutane, 1,3,6-trichlorohexane, and the like. Instead of chlorine in the epihalohydrins and trihaloalkanes, the corresponding bromine and iodine compounds can also be used, including compounds containing two or even all three of the above halogens.

The component b) compounds of formula II are organic (optionally alkoxylated) alcohols or the corresponding sulfhydryl or amine compounds.

The $R^2$ group can be a substituted or unsubstituted, saturated or unsaturated hydrocarbon group having from 1 to 36 carbon atoms. Examples of such hydrocarbon groups include linear or branched alkyl groups having from 1 to 36 carbon atoms, preferably from 4 to 22 carbon atoms, linear or branched alkenyl or alkynyl groups having from 2 to 36 carbon atoms, preferably from 4 to 22 carbon atoms, aryl groups having from 6 to 22 carbon atoms, and arenyl groups having from 7 to 36 carbon atoms. Arenyl groups are alkyl-substituted aromatic radicals having a free valance at an alkyl carbon atom such as a benzylic group.

The $R^2$ group can also be a saturated carbocyclic group, an unsaturated carbocyclic group having one or more multiple bonds, a saturated heterocyclic group, or an unsaturated heterocyclic group having one or more multiple bonds. Any of the above $R^2$ groups can be substituted groups, i.e. the groups can be single or multiple substituents such as one or more halogen substituents, for example, Cl, Fl, I, and Br; a sulfur functionality such as a mercaptan or thio group, a nitrogen functionality such as an amine or amide functionality; an alcohol functionality, a silicon functionality, e.g., a siloxane; an ether functionality, e.g. a $C_1$–$C_6$ alkoxy group; or any combination thereof.

The $R^2$ group in formula II is preferably a branched chain alkyl group containing from 4 to 36 carbon atoms, preferably from 4 to 12 carbon atoms, and more preferably from 8 to 10 carbon atoms.

When the X group of formula II is an —S— group, the R group will preferably have from about 4 to about 22 carbon atoms, examples of which include but are not limited to, dodecyl mercapto and 1-hexadecanethio.

When the $R^2$X-group of formula II is a secondary or tertiary amino group, the group preferably contains from 4 to 22 carbon atoms, and n is preferably a number of from 1 to 50. Examples of primary and secondary amines useful for obtaining the $R^2$X-group include, but are not limited to, dibutyl amine, cyclohexyl amine, isodecyl amine, and dioctylamine.

Optionally an additional component c) can be reacted with the linking agent of formula I and the compound of formula II. A glycidyl ether or amine can be added to the reaction of formula I and formula II. The amount of the glycidyl ether or glycidyl amine is from about 1 to about 20 mole percent based on the moles of the compounds of formula II used in the reaction. When the glycidyl ether or glycidyl amine is added, the ratio of component a) plus the glycidyl ether or glycidyl amine to component b) is preferably from about 1.2:1 to about 5:1. Examples of glycidyl ether include, but are not limited to, PEG 600 diglycidyl ether, TETRONIC™ 701 tetraglycidyl ether, triglycidyl di- or triethanolamine, polyoxyethylene (POE 200) tallow amine diglycidyl ether, propoxylated (POP10) trimethylol propane triglycidyl ether, propoxylated (POP7) pentaerythritol tertraglycidyl ether. Examples of glycidyl amines include, but are not limited to, tetraglycidyl 1,6-hexane diamine, tetraglycidyl JEFFAMINE™ EDR-148, and tetraglycidyl isophorone diamine.

When Y in formula II is an amine or sulfhydryl group, the resulting compounds can be readily prepared from the corresponding alcohols wherein the terminal hydroxy group is replaced by an —SH group or by an amine nitrogen. For example, a compound of formula II where Y is —OH can be subjected to a catalyzed ammoniation (with ammonia, or a lower alkylamine) for replacement of the hydroxyl.

In the compounds of formula II, the AO groups when present are preferably all ethyleneoxy groups. However, as stated above, each AO group can be independently an ethyleneoxy (EO), 1,2-propyleneoxy (PO), or 1,2-butyleneoxy (BO) group, i.e. any one or more of such groups can be present, and they can be present in any order, as well as be present in blocks, e.g. compounds of formula III:

$$R^2O(EO)_m(PO)_p(BO)_qH \qquad (III)$$

wherein $R^2$ has the meaning given above, m is a number of from 0 to 100, preferably from 1 to 50, p is a number of from 0 to 50, e.g. from 1 to 50, and q is a number of from 0 to 50, e.g. from 1 to 50. Compounds of formula III in which $R^2$ is a branched chain alkyl group having from 4 to 12 carbon atoms, m is a number of from 2 to 20, and p and q are 0 are preferred.

The degree of hydrophilic and hydrophobic properties of the reaction products of components a) and b) can be readily controlled by controlling the type and number of alkyleneoxy groups in component b). For example, the greater the number of ethyleneoxy groups present, the greater the water solubility, while the presence of 1,2-propyleneoxy groups and/or 1,2-butyleneoxy groups for example, will decrease water solubility.

In general, the compounds of formula III wherein the sum of n, m, and p is at least 1, and especially at least 2 are preferred for use herein.

The branched reaction products used in the practice of the invention can be prepared by reacting components a) and b) (and c), if present) together, preferably in the presence of an inert organic solvent, preferably a solvent such as toluene that will azeotrope water, and in the presence of an inorganic base such as an alkali metal hydroxide, e.g. aqueous sodium hydroxide or potassium hydroxide, at a temperature in the range of from 60 to 125° C. In a preferred embodiment of the process, component B) is first mixed with the base, and the organic solvent, if present, and water is removed, e.g. by azeotropic distillation. Then component a) (and c), if present) is slowly added and the reaction continued until the reaction is completed. The reaction mixture is filtered and the filtrate vacuum stripped to remove any organic solvent.

Inert organic solvents that can be used in the above process are nonmiscible with water and nonhydroxylic. Examples of such solvents include toluene, $CHCl_3$, $CH_2Cl_2$, chlorobenzene, acetonitrile, and petroleum ethers, preferably toluene.

Wastewater is a general term that broadly encompasses aqueous water flows from various sources.

Sewage comprises water-carried wastes in either solution or suspension, that flow away from a community. Also known as wastewater flows, sewage is the used water supply of the community. It is usually more than 99.9% pure water and is characterized by its volume or rate of flow, its physical condition, its chemical constituents, and the bacteriological organisms that it contains. Depending on their origin, wastewaters can be classed as sanitary, commercial, industrial, or surface runoff.

The spent water from residences and institutions, carrying body wastes, ablution water, food preparation wastes, laundry wastes, and other waste products of normal living, are classed as domestic or sanitary sewage. Liquid-carried wastes from stores and service establishments serving the immediate community, termed commercial wastes, are included in the sanitary or domestic sewage category if their characteristics are similar to household flows. Wastes that result from an industrial process or the production or manufacture of goods are classed as industrial wastes. Their flows and strengths are usually more varied, intense, and concentrated than those of sanitary sewage. Surface runoff, also known as storm flow or overland flow, is that portion of precipitation that runs rapidly over the ground surface to a defined channel.

Wastewaters from all of these sources may carry pathogenic organisms that can transmit disease to humans and other animals; contain organic matter that can cause odor and nuisance problems; hold nutrients that may cause eutrophication of receiving water bodies and may contain hazardous or toxic materials. Proper collection and safe, nuisance-free disposal of the liquid wastes of a community are legally recognized as a necessity in an urbanized, industrialized society.

In urban areas, wastewaters are generally conveyed away through a series of buried pipes. The inlets, manholes, pipes, and other appurtenances constitute the sewerage system. A system carrying only domestic wastes is known as a sanitary sewer system; if only storm runoff is collected in the drains, it is a storm drainage system; but if both storm water and wastewater are carried in the same sewerage system, the system is known as a combined system. In rural or suburban areas, sanitary sewage from individual buildings may be collected and disposed of on-site through the use of septic tanks and disposal fields.

The used water supply leaving a community is directly related to the quantity and timed use of water entering that community. To establish values for the engineered design of collection systems, pump stations, and treatment plants, the water consumed within a community must be measured; or it must be evaluated, taking into account the climate, extent of industrialization, types of residential districts, socioeconomic status, water cost, water quality, and delivery pressure. Not all water delivered to a community ends up as flow into the sewerage system. Water is lost through public use, fire fighting, street washing, and park and home irrigation, and is consumed in commercial and industrial production and for steam generation and cooling. Average water used in the United States, reported as 628 liters per capita per day (lpcd), includes water for residential, mercantile, commercial, public, light and heavy industry, and unaccounted-for losses. Per-capita water use tends to rise with increased community size.

Some of the lost flow is replaced by additions from groundwater infiltration, from inflows and, at times, from private wells and industrial activities. Infiltration is groundwater leakage through poor joints, fittings, and connections into the sewerage system lying below the groundwater level. Inflow is surface water, or directed water entering the sewerage system through manhole covers, illegal roof leaders, foundation and area drains, cooling water discharges, and street washing.

A community's wastewater flow may be only 60–75% of the average water supply when new sewerage systems with tight joints and no illegal connections are installed, and infiltration/inflow is kept to a minimum. However, in time, infiltration/inflow increases; therefore, engineers frequently assume wastewater flows equal to community water supply.

Human activities follow a diurnal pattern; thus fluctuations in water supply and consequently in sewage flows occur according to time of day, day of the week, weather conditions, holidays, and seasons. Size of community, as well as the presence and type of industry, and institutions such as colleges, prisons, or hospitals all affect the quantity and fluctuation of flows. Wastewater peaks are smaller and lag behind water supply peaks within the same community because water supply is a pressure system that is measured at the point of supply (or initial) distribution, whereas wastewater is a gravity system that is usually measured at the treatment plant. Measured gravity flow at a collection point is affected by the lag due to areal time of concentration and by available storage volume within the pipes. On any given day the flow is lowest during the night, increasing to peaks at breakfast time and in the evening. In general, the smaller the community, the greater the daily variation from the average. Water use, and hence sewage flow, not only varies with time of day but also varies with time of year. During hot, dry months the flows are greater than during cold, wet periods. Infiltration/inflow varies with rainfall frequency and intensity.

For proper engineering design to safely control and contain all anticipated variations in flow, adequate capacity must be provided within the sewerage system, pumping stations, diversions, treatment plants, and outfalls. To develop practical design flow valves, not only the diurnal flow variations but also peak flows must be considered. Peak flows are the maximum flows that may occur over a relatively short period of time, usually time of concentration for storm flows and up to 1 hr. for other wastewater flows. The total annual flow for a community, divided by 365 days, is termed the average daily flow, and this value is taken as unity.

Tests and analysis are employed to establish the characteristics of wastewaters such as composition; condition; and physical, chemical, and biological constituents. Water, as used within a community, undergoes only a slight delay in its passage along the hydrologic cycle. In the modern world, water separated from sewage may eventually be directed into a potable water supply. As such, knowledge about what is being returned to the watercourse and into the immediate environment is essential. Wastewaters contain a myriad of dissolved and suspended materials, including minerals, salts, organic compounds, heavy metals, bacteria, pathogenic organisms, sediments, and toxic substances. It is society's responsibility to return the spent water to the water-use cycle with safe and acceptable constituents. Tests are used to determine treatability of the waste amounts of solids and methods to handle these residues, economical amounts of necessary or required additives, and presence of pathogenic organisms, and to establish safe limits for constituents found in effluents that are to be returned to the environment. Technologies and mensuration methods now employed for testing wastes can establish quantities as low as 1 part per trillion (ppt).

Results of chemical laboratory tests are usually expressed in mg/liter or $g/m^3$. For much smaller values, micrograms ($\mu g$)/liter are used. Since wastewater is more than 99.9% water, mg/liter can be interchanged with parts per million (ppm) and $\mu g$/liter with parts per billion (ppb). For solids and sludges, where concentrations are greater than 1 kg/liter, percentages are commonly used. Flows are reported in liters/s, $m^3/s$, or $10^6$ gal/day (MGD).

Since any examination is only as useful and as valid as the sample, planning and care must be exercised in selecting the sampling point, the type and frequency of collection, and the actual manner in which the sample is obtained. Sampling may be a single, random sample, known as a grab sample, or it can be a more representative sample that is made up of a repeated number of collections that are composited by either flow or time. All samples collected must be preserved so that there is no significant change in quality between time of sampling and actual testing.

Tests are characterized as physical, chemical, for solids, bioassay, or bacteriological. The physical tests made for turbidity, color, oils, suspended solids, dissolved oxygen, and temperature relate to the esthetic senses. Sewage may be categorized by its dissolved-oxygen content as fresh, stale, or septic. Fresh sewage has a dissolved oxygen content well in excess of 2 mg/liter, is grayish in color, usually is turbid containing visible solids, but has little or no odor. As organic matter undergoes bacterial decomposition, the dissolved oxygen content drops, color darkens and is esthetically unacceptable and also more difficult to treat.

Various tests are employed to determine the type and quantity of organics present. Aerobic organisms present in wastewater require dissolved-oxygen and organic matter for growth. As they multiply, they use up the dissolved oxygen but stabilize the organic matter and reduce its putrescibility. By measuring the rate at which these bacteria deplete the dissolved-oxygen during 5 days at 68° F. (20° C.), the organic strength, reported at the biochemical oxygen demand, is determined. The chemical oxygen demand test uses a strong oxidizing agent instead of bacteria. This quicker method indicates that portion of the organic matter that is susceptible to chemical oxidation. Though both tests provide a measure of oxygen required by organics in wastes, they are different processes producing results that may differ widely and not provide good correlation.

In a small waste sample or where there is a low concentration of organic matter, the organics can be determined by the total organic carbon test. In this test, a known quantity of the sample is injected into a specially designed high-temperature retort. The resulting carbon dioxide produced is automatically read by an infrared analyzer. Still another test for organic content is the total oxygen demand test.

Wastewater solids provide important information about the strength, character, and the quantity of residue that will ultimately have to be disposed of. A measured quantity of a waste that is evaporated to dryness and weighed establishes the total residue. Passing another measured quantity of the same waste through a filter and weighing the trapped residue indicates the suspended solids. Subtracting the weight of the suspended solids from the total residue yields the weight of dissolved solids. Settleable solids are determined by placing a liter of the same waste in an Imhoff cone, letting it stay quiescent for an hour, and measuring what has settled out. Once dry weights of the tested waste have been determined, each sample is burned in a muffle furnace. Organic matter is volatilized, and inert matter or ash remains. The weight loss represents the organic component in each constituent portion of the solids found in that waste.

Many tests are used to evaluate plants involved in pollution control operations and to define the residue discharged in the effluent. Tests are conducted for pH, alkalinity, residual chlorine, nitrogen in its various forms, and phosphorous. Bioassay tests permit rapid, realistic interactions between minute quantities of difficult-to-detect toxic components on test organisms in their local environment. Bioassays using fish as test organisms, establish maximum concentration of toxics, and also provide the means of establishing required dilutions of effluents, so that they will not have significant impact on the local environment.

The sources of most waterborne pathogenic diseases are human and animal fecal discharges. Sewage contains these discharges, but the pathogenic organisms are both few in number and difficult to test. A human voids $2-3\times10^{11}$ coliform organisms daily. Since these harmless organisms are hardy, plentiful, and relatively easy to test for, and emanate from the body together with any other pathogens, they are used as the index organisms for fecal pollution.

Sewage disposal is the ultimate return of used water to the environment. Disposal points distribute the used water either to aquatic bodies such as oceans, rivers, lakes, ponds, or lagoons or to land by absorption systems, groundwater recharge, and irrigation. Wastewaters must be mixed, diluted, and absorbed so that receiving environments retain their beneficial use, be it for drinking, bathing, recreation, aquaculture, silviculture, irrigation, groundwater recharge, or industry.

Wastewater is treated to remove contaminants or pollutants that affect water quality and use. Discharge to the environment must be accomplished without transmitting diseases, endangering aquatic organisms, impairing the soil, or causing unsightly or malodorous conditions. The type and degree of treatment are dependent upon the absorption capability or dilution capacity at the point of ultimate disposal.

In the United States, federal and state agencies have established two types of standards. Water quality standards are used to measure an aquatic ecosystem after the discharge has entered and has been mixed with it. Effluent standards define what is allowed within the wastewaters discharged into the aquatic environment. Water quality standards relate to the esthetics and use of the receiving environment for public water supply, recreation, maintenance of aquatic life and wildlife, or agriculture. The parameters of water quality, which define the physical, chemical, and biological limits, include floating and settleable solids, turbidity, color, temperature, pH, dissolved oxygen, biochemical oxygen demand (BOD), numbers of coliform organisms, toxic materials, heavy metals, and nutrients. Effluent standards specify the allowed biochemical oxygen demand, suspended solids, temperature, pH, heavy metals, certain organic chemicals, pesticides, and nutrients in the discharge.

Discharges into any aquatic system cannot contravene the standards set for the most beneficial use of that water body. Multiple discharges from various sources, different political jurisdictions, diurnal variations in temperatures and flows, location of sampling, and time of sampling complicate efficacy and ease of enforcing water quality standards. Point-source wastewater effluent discharge standards, established for ease of sampling, simplicity of repetitive testing, and clarity for enforcement, are more likely to be used by regulatory agencies.

Pollutional constituents, which impact on sight, smell, and esthetic sensibilities, relate to color, pH, turbidity, and dissolved oxygen. Contaminants, which impact on public health and usable water quality, relate to the presence of pathogens, toxic matter, and oxygen-consuming organic substances. The concentration of suspended, colloidal, and dissolved matter, and organics exerting a biochemical oxygen demand within wastewater are reduced by natural processes of settling, oxidation-reduction, dilution, and bleaching. Degradable organics are destroyed within receiving water bodies by bacteriologic and biologic stabilization. The multiplying bacteria are themselves subjected to environmental stresses, predation, and dying, which ultimately reduce their concentration.

Water, in its continuous cycle, exists in various states or forms with different levels of quality. The water molecules themselves remain unchanged. The quantities of pollutants and contaminants associated with the molecules determine water's acceptability or purity. Given sufficient time, water purifies itself. Pollutants and contaminants entering the aquatic system are altered, modified, reduced, and eliminated. New residential communities with greater population, increased industrial activity, and intensified agricultural practices have reduced the distance and hence the time between points of wastewater production and water usage. Wastewater treatment has become imperative in order to maintain a safe, healthy, and viable environment.

There exists a natural balance in the environment. Floatables within sewage discharges rise to the surface upon entering an aquatic ecosystem and ultimately wash ashore to be stabilized by soil bacteria. Heavier suspended solids settle out as benthic deposits that slowly undergo anaerobic decomposition and stabilization. Colloidal and dissolved matter may coagulate and settle, become food for aquatic organisms, or undergo aerobic bacterial attack. The quantities of dissolved oxygen present indicate levels of stream environment viability. Levels of stream dissolved oxygen are dependent on the presence of biodegradable organics and aerobic bacteria. Aerobic bacteria utilize dissolved oxygen as they grow and multiply while feeding in the organic matter that exerts the biochemical oxygen demand. Diffusion at the air-water interface replenishes the diminished dissolved oxygen levels. This complex process is dependent upon biochemical oxygen demand, dilution, temperature, depth of water, turbulence, dissolved oxygen, presence of toxic chemicals, pH, floating scum, and turbidity. A graphic representation known as the oxygen sag curve depicts the summation of oxygen depletion (deoxygenation curve) and oxygen replenishment (reaeration curve). If the point of critical deficit, the lowest point on the oxygen sag curve, does not depress the stream dissolved oxygen below acceptable values, the stream ecology will not be adversely affected. Summer, when temperatures are elevated and stream flow is at its lowest level, is the crucial period for compliance with stream quality standards.

Factors of mixing, turbulence, dilution, and oxygen transfer affect all aquatic ecosystems. In quiescent, stagnant, nonflowing water bodies, these physical actions are severely curtailed. Deep lakes stratify vertically, as cooler water, with greater density, sinks to the bottom. Summer sunshine warms the surface layer, the epilimnion, and caps the lake, intensifying stratification. Oxygen transfer by both diffusion and wind-wave turbulence maintains a higher concentration of dissolved oxygen in the epilimnion than in the lower strata. In autumn, air temperatures drop; the epilimnion is rapidly cooled, and this surface layer of water becomes heavier and sinks, developing vertical density currents. This rapid change, fall overturn, carries the water laden with dissolved oxygen down, and exposes water with low concentrations of dissolved oxygen to the atmosphere where rapid reaeration occurs. Dissolved oxygen is distributed and the natural process of self-purification can continue through most of the lake depth. Ponds, being shallower, do not stratify; they are usually fully mixed by wind, wave, and local current action.

Disposal of wastewater into lakes and ponds is planned to take full advantage of the local circulation patterns developed by currents, wind action, or waves, and by dispersion and mixing. Outfalls are usually submerged, with many horizontal ports to discharge effluent in spaced, separated locations. Wastewaters, usually warmer than the deeper hypolimnion, tend to develop both horizontal and vertical mixing and dilution as they rise from these dispersed, submerged discharges.

Phosphorous, a major cause of lake eutrophication, is a critical wastewater disposal problem in lakes. Phosphorous enters lakes from septic tank effluents, from agricultural fertilizers and ground runoff, and from wastewaters effluents.

Lagoons are ponds constructed especially for sewage treatment and disposal. Lagoons can remove very high amounts of incoming organic wastes, solids, and bacteria through biological and physical processes. Known by various names, depending on their function, how oxygen is added, and the ultimate method of liquid disposal, the types include oxidation, stabilization, aerobic, anaerobic, facultative, aerated, polishing, concentrating, evaporating, and groundwater-recharge ponds. In all, organic and bacteriological contaminants are reduced and stabilized by facultative aerobic bacteria using the dissolved oxygen obtained from photosynthetic algae and diffusion. Lagoons, with large surface areas providing long detention times, produce outflows that are readily acceptable, after disinfection, to the environment. Lagoons can percolate stabilized sewage for groundwater table recharge, or employ effluent directly for irrigation or silviculture; in arid areas they may rely totally on evaporation. Oxidation ponds are used for aquaculture to grow fish for increased food protein production.

Design of a wastewater disposal system utilizes site-specific combinations of topography, soil-surface texture and matrix, climate, and plant and crop characteristics. Land disposal requires wastewaters to undergo preapplication treatment to reduce or alter pollutional loads, to prevent clogging of distribution and soil absorption systems, and to prevent malodorous conditions.

Effluent dissipation from on-site septic tanks, using buried leaching drain tiles, relies on the absorbing soil's hydraulic permeability and bacteria to decompose effluent organic matter. If organic matter is being discharged to the soil matrix faster than bacteria can decompose it, the system will clog and fail, causing odors and objectionable flows of liquids on the soil surface.

Crop irrigation by trench, surface distribution, or spray irrigation is used in areas where there is inadequate rainfall. Liquid applied over large land areas at rates up to 4 in. (10 cm) per week is evaporated, transpired, or percolated to groundwater. Most applied nutrients, organic materials, and pollutants are adsorbed on the soil matrix or by the vegetation.

In overland flow, pretreated wastewater spreads over gently sloping, textured soil surfaces with ground cover. Soil must have a relatively low permeability to prevent significant infiltration to the groundwater table. Effluent is dispersed in sheet flow, at low velocities, and through selected vegetation to prevent erosion. Effluent-suspended solids and organic substances are filtered, oxidized, and adsorbed.

Discharge of sewage into estuaries, bays, or oceans relies on large dilution factors and mixing. Effluents discharged through submarine diffusion systems are less dense and warmer than the receiving salt water. Since the wastewater is more buoyant, it rises toward the surface as a wastewater field, with initial dilution and mixing. As tides, littoral currents, waves and wind cause turbulence, eddy diffusion and dispersion develop. Organic loads, nutrient quantities, dissolved oxygen, and floatable material all affect the initial dilution and dispersion of characteristics necessary to prevent unwanted impact on bathing beaches, recreational facilities, and mariculture in the salt-water environment. Pathogens may affect filter-feeding mollusks; toxic chemical and sediments may impact on benthic feeders; and fields of upwelling sewage discharges may affect the surface of the salt-water ecosystem. Many variables evolving from paths of tides, density currents, littoral and advective drift, freshwater flushing rates, dispersion, and vertical stratification provide concerns for safe and proper nearshore discharges into the salt-water environment.

Sewage treatment procedures are unit processes used to separate, modify, remove, and destroy objectionable, hazardous, and pathogenic substances carried by wastewater in solution of suspension in order to render the water fit and safe for intended uses. Treatment removes unwanted constituents without affecting or altering the water molecules themselves, so that wastewater containing contaminants can be converted to safe drinking water. Stringent water quality and effluent standards have been developed that require reduction of suspended solids (turbidity), biochemical oxygen demand (related to degradable organics), and coliform organisms (indicators of fecal pollution); control of pH as well as the concentration of certain organic chemicals and heavy metals; and use bioassays to guarantee safety of treated discharges due to the environment.

In all cases, the impurities, contaminants, and solids removed from all wastewater treatment processes must ultimately be collected, handled, and disposed of safely, without damage to humans or the environment.

Treatment processes are chosen on the basis of composition, characteristics, and concentration of materials present in solution or suspension. The processes are classified as pretreatment, preliminary, primary, secondary, or tertiary treatment, depending on type, sequence, method of removal of the harmful and unacceptable constituents. Pretreatment processes equalize flow and loadings, and precondition wastewaters to neutralize or remove toxics and industrial wastes that could adversely affect sewers or inhibit operation of publicly owned treatment works. Preliminary treatment processes are employed to protect plant mechanical equipment; remove extraneous matter such as grit, trash, and debris; reduce odors; and render incoming sewage more amenable to subsequent treatment and handling. Primary treatment employs mechanical and physical unit processes to separate and remove floatables and suspended solids and to prepare wastewater for biochemical treatment. Secondary treatment utilizes aerobic microorganisms in biological reactors to feed on dissolved and colloidal organic matter. As these microorganisms reduce biochemical oxygen demand and turbidity (suspended solids), they grow, multiply, and form an organic flow, which must be captured and removed in final settling tanks. Tertiary treatment, or advanced treatment, removes specific residual substances, trace organic materials, nutrients, and other constituents that are not removed by biological processes.

Wastewater, depending on its source, varies in quantity, strength, and composition. Pretreatment, particularly of sewage containing industrial wastes, neutralizes, alters, or removes nonbiologically degradable, toxic, hazardous, or highly corrosive materials before they enter the municipal sewer system. Chemical neutralization brings pH values to the range 6.0–8.0 and provides buffering capacity. Coagulation, flotation, and surface skimming of oils, greases, or other light constituents are enhanced by adding air or chlorine.

In the equalization process, widely varying flows are stored and then discharged more uniformly over longer time periods. Mixing and storing different flow streams neutralizes, dilutes, and dampens both quantities and concentrations, reducing shock loads on receiving systems. Equalization tanks are aerated to mix the sewage, inhibit septicity, increase gas exchange, and prevent sedimentation.

Wastewaters often contain sand, cinders, ceramic shards, glass, and other granular inorganic matter that is abrasive, causes wear on pumps and equipment, clogs lines, and occupies tank space. By controlling velocities in grit chambers at about 1 ft/s (0.3 m/s), dense granular matter [larger than 0.008 in. (0.2 mm)] settles, while materials with low specific gravity remain in suspension within the flow. Settled solids, being removed from the bottom by grit elevators, are agitated within the incoming flow. Agitation abrades and separates clinging organic matter from the inert solids, and the flowing water carries those removed putrescible substances away, leaving a washed grit that is ready for landfill disposal.

Unwanted materials like plastic objects, throwaway sanitary hygiene products, diapers, and towels, and items ranging from string to bed sheets or toothpicks to tree limbs become part of the sewage flow. Screens are provided to protect equipment from impact damage, from stringy material winding around and fouling rotating shafts, or from plastics and rags that clog valves. Bar racks and screens remove such large solids and floatables. Bar racks composed of rigid parallel bars, spaced 0.5–3 in. (12.5–75 mm) apart, held in place by support cross members, are installed within a controlled flow channel to catch this debris. Large, coarse material that is carried in the wastewater impacts the bar rack and is retained on the upstream face, from which it is mechanically removed and collected by traveling rakes.

Screens are formed of wire mesh, screen cloth, or perforated plates, with openings 0.5 in. (12.5 mm) or less. Coarse screens, with openings greater than 0.2 in. (5 mm) are used as pretreatment. Medium screens, 0.01–0.06 in. (0.8–1.5 mm) may be used in lieu of primary treatment. Fine screens, up to 0.003 in. (0.075 mm) openings are used as final screening before plant discharge.

Disk, drum, band, and other styles of preliminary treatment screens are moveable, with only a portion rotating within the flow. As the screen rotates, clean surfaces enter the wastewater, and previously immersed areas are lifted out and cleaned of solids caught on the surface.

Removal, handling, and disposal of screenings from bar racks and coarse screens are generally difficult maintenance problems, with associated odors and esthetically unpleasant conditions. To deal with this situation and to develop a smaller, more uniform sized solid, comminution (shredding) devices are used. Solids, trapped and held by the force and flow of liquid on a slotted plate or bars, are cut up or shredded by moving cutters or teeth. The solids, reduced in size, pass through the openings and are carried downstream to further treatment.

Primary sedimentation, or clarification, is the first process where removal of substantial quantities of suspended solids and materials causing biochemical oxygen demand in wastewater flow occurs. Sedimentation tanks, rectangular or circular, operate on a continuous flow-through basis, yet they maintain relative quiescence to permit suspended solids to settle if the specific gravity is greater than that of water, or to float if the specific gravity is less. Mechanical devices remove the accumulated suspended solids (sludge) from the tank bottom, while floatable materials (skimmings) are taken off the surface. The clarified liquor, known as primary effluent, is discharged over the tank's effluent weirs.

Discrete particles of uniform size, shape, and specific gravity settle according to Stokes' law. Theoretically, if the velocity of a downward-settling particle is greater than the horizontal velocity of the carrying liquid, the particle will be captured and retained within the sedimentation tank. However, empirical values are used because sewage solids vary in shape, size, specific gravity, and concentration, and because the rate and path of settling are affected by temperature, age, density, and wind currents as well as eddies developed by mechanical scrapers and turbulence at influent and outlet structures.

Removal of suspended solids and biochemical oxygen demand is based on surface overflow rate and detention time. The surface overflow rate is expressed in gal/ft$^2$ (m$^3$/m$^2$) of tank surface area per day. Detention time varies from 30 min for minimal removal prior to some types of biological treatment, to 60–90 min (typical values within conventional plants), and longer times if chemical coagulation or nutrient removal is employed.

A solids contact clarifier diverts the incoming wastewater through a layer or blanket of previously settled solids. Suspended solids within incoming sewage contacts the sludge blanket, is agglomerated, and remains trapped within the sludge blanket as the liquid rises and overflows the outlet weirs. Although efficient for chemical and special suspensions, and frequently used in water treatment, solids contact clarifiers are used infrequently for biological floc, because extended detention times, particularly when it is warm, leads to septicity, gasification, and odors.

Based on discrete particles, removal of suspended solids is related to available surface area and is independent of tank depth. The use of inclined tubes or plates (lamella) within sedimentation tanks increases the theoretical tank surface area and reduces both the settling time of the particles and the depth at which they come to rest. With highly inclined plates or tubes, there is increased settling efficiency, and solids contact benefits may also be derived, but some problems with biological decomposition remain.

Use of chemicals such as lime, alum, chlorine, clays, or polyelectrolytes increases removal of suspended solids from wastewater. These systems produce more sludge and impact on subsequent handling of solids. The added costs for chemicals, feeders, and handling of solids make the use of chemicals less attractive.

Various configurations are employed to reduce velocities at inlet and outlet structures and prevent adverse mixing, currents, short circuiting, or scour. Weir overflow rates are limited to 15,000 gal per day per lineal foot of weir face (186 m$^3$/m.d).

Static or inclined self-cleaning screens, centrifugal screens, and rotary-drum screens are being used to upgrade overloaded primary units and to replace preliminary and primary units. Removal of suspended solids and biochemical oxygen demand by screens is generally not as complete as by conventional units, but overall costs are lower. Subsequent plant units must be sized to compensate for these differences in removal.

Biological organisms, predominately aerobic bacteria, convert and metabolize dissolved and colloidal matter remaining in wastewater to new cellular material, carbon dioxide, and water. These biological processes use organisms that form either a fixed film (attached growth) or are motile (suspended growth); they convert degradable organics to different, larger forms without significantly reducing total biochemical oxygen demand. Safe discharge to the environment and compliance with effluent standards require that the biota and newly formed cellular material be removed. This is accomplished by provision of secondary settling tanks that function as an integral part of the biological process.

Given adequate detention time, dissolved oxygen, controlled pH, appropriate temperature, absence of any toxic materials or shock loads, these biological processes can reduce biochemical oxygen demand to under 15 mg/liter and suspended solids to under 20 mg/liter. Not all wastewater organics can be fully or adequately degraded in the time available and under constraints found in publicly owned systems.

Trickling filters contain beds of inert material, with large surfaces and voids that support slime growth. This growth, or attached zoogloeal mass, is composed of algae, fungi, protozoa, rotifera, nematoda, and, most importantly, aerobic bacteria. Wastewater is applied to the surface of a trickling filter having varying depths and made up of volumes of rock, slag, or synthetically formed shapes. The organic materials in this intermittently applied wastewater, flowing over and through the aerobic gelatinous matrix adhering to the support surfaces, undergo biologic coagulation, precipitation, oxidation, and clarification as the flow moves downward to the underdrains. Organisms, in the presence of oxygen, convert the organic substances by various physical, chemical, and enzymatic processes to energy for life, growth, and replication, while giving up carbon dioxide, nitrates, and sulfates to the passing liquid stream.

This reactive zoogloeal mass converts organic matter and trapped particles to a humic mass as long as there is adequate oxygen transfer. If the film becomes too thick, or otherwise so impacted or compacted that oxygen cannot diffuse, portions become anoxic, and the film loses its capability to adhere to the support surface. Applied wastewater physically scours away nonattached portions, rejuvenating the filter by exposing areas for new colonization. Dislodged humic mass, known as the slough-off, is washed through the filter's large voids and conveyed through the underdrains to the secondary settling tank for ultimate capture and disposal.

Because daily wastewater flows into a publicly owned treatment works are highly variable both in amount of flow and in organic loading, they cause fluctuations in the liquid applications to the trickling filters. Rapid swings in biological density within the attached matrix develop, reducing efficiency. To provide flow and loading uniformity, a portion of the wastewater is recirculated after passing through the filter. This recirculation maintains continuous growth and sloughing, improves operation, increases efficiency, and reduces bed volume. Recirculation rate is the ratio of recycle flow to average daily plant inflow.

Total liquid flow, generally applied through rotating arms over the surface of the bed, intermittently doses each portion and is known as the hydraulic application rate. The average daily dry weight of new organic matter applied to the total bed volume is the organic loading rate.

Activated sludge is an aerobic suspended-growth process in which biodegradable organics in wastewater are intimately mixed with a concentrated mass of biota and oxygen within an aeration tank. New microorganisms grow and flocculate as the biotic mass adsorbs, oxidizes, and reduces the organic wastes. As the mixed liquor leaves the aeration tank following several hours of aeration, the biotic mass with the newly formed floc is separated with final settling tanks. A portion of the settled floc, the activated sludge, is returned to the aeration tank to maintain the required concentration of biota, while excess sludge is removed for solids handling and ultimate disposal. Air, required for utilization of dissolved oxygen in metabolism and respiration, is also provided to maintain mixing and prevent sedimentation in the aeration tank.

Modifications of the activated-sludge process relate to how, where, when, and for how long returned activated sludge and oxygen is introduced into the aeration tank and maintained in contact with the mixed liquor. These modifications of conventional activated sludge are known as tapered aeration, contact stabilization, complete mix, and pure oxygen. Mechanical or compressed air systems are used to introduce and maintain dissolved oxygen and mixing. Mechanical systems entrain atmospheric air through brushes, impellers, propellers, or turbines, while compressed air is introduced near the tank bottom through porous diffuser plates, spirally wound tubes, spargers, nozzles, or injection jets.

Depending upon the process used, parameters such as empirical ratios of biodegradable organics (food) to concentration of microorganisms, aeration contact time, concentration of solids in the mixed liquor, and loading criteria for aeration tanks are established to achieve the desired degree of reduction of biochemical oxygen demand. Suspended growth systems, with relatively short detention times, are more sensitive to hydraulic, organic, and toxic shock loads and require greater operational skill and monitoring than fixed-film processes. However, suspended growth systems occupy much less space and can produce effluents with lower soluble biochemical oxygen demand and suspended solids.

For the suspended-growth system to operate optimally, the solids in the mixed liquor leaving the aeration tank must be completely separated, settled, and returned to the aeration tank quickly. Final settling tanks, generally have lower values of surface overflow rate and are deeper, since both separation and sludge densification of the light, fluffy, biofloc must be accomplished.

For industrial wastes and smaller plants, aerated lagoons, oxidation ponds, and waste-stabilization lagoons are employed for secondary treatment or for final polishing after conventional treatment. Oxidation ponds, with large surface areas, depth less than 5 ft (1.5 m), with loading rates not to exceed 50 lb/acre (56 kg/ha) of biochemical oxygen demand, rely on natural reaeration, diffusion, and photosynthesis. Bacterial and algal actions reduce putrescible organics, converting them to stable algal cells. Although some solids settle and undergo anaerobic decomposition, oxidation ponds can support fish life. Evaporation, screened or filtered settled outflow, maintains liquid levels.

Aerated lagoons are facilities that are intermediate between oxidation ponds and activated sludge, since no sludge is recycled. They are frequently used to pretreat sewage with high organic loads or industrial wastewaters prior to discharge to publicly owned treatment works. Basins are 8–18 ft. (2.4–5.5 m) deep, and complete mixing is carried out by using mechanical devices, with detention times of several days. Some solids may settle and undergo anaerobic decomposition. When used as secondary treatment, basins are frequently followed by facultative lagoons, where liquid is retained for up to 20 or more days. The upper portion of a facultative lagoon is maintained aerobic, while the bottom, benthic zone, where solids accumulate, undergoes anaerobic decomposition. Released gases, rising particles, and bacteria are enmeshed, absorbed, destroyed, and converted to algal cells in the upper portion. Effluent may be subject to final mechanical screening, although frequently the effluent evaporates, percolates, or is used for land application.

Rotating-drum microscreens, with stainless steel or plastic cloth having openings 30 micrometers in diameter, remove solids carried over from biological treatment and provide an effluent that is relatively free of turbidity. Filters are used for polishing of the final effluent as well as for removal of chemical precipitates from advanced treatment systems. Filtration, which is a complex process of screening, adsorption, and sedimentation, is defined and classified by the media, physical force, or application method employed. Flow may be induced by gravity, pressure, or vacuum; may be applied intermittently or continuously; and may be upflow, downward, or across sand, mixed media, granular carbon, membranes, or diatomaceous earth. Cleaning of filters, usually by backwashing, results in a new wastewater that must be captured, handled, and ultimately disposed of.

Disinfection processes differ from sterilization in that they kill pathogenic organisms by physical or chemical means without total destruction of all the organisms present. Disinfecting agents should, at low concentrations, be highly selective and toxic to targeted pathogens. They must be stable, noncorrosive, economical, safe to humans and the environment, unaffected by pH or temperature, and long-lasting. None of the available agents or processes meets all or even most of these criteria. Disinfecting agents such as heat, phenols, alcohols, strong acids or alkalies, and halogens cause coagulation and denaturing of cell protein. Soaps and detergents may injure cell membranes and will change surface tension, or affect permeability. Oxidizing agents such as halogens, hydrogen peroxide, ozone, and heavy metals inhibit or denature enzymes and remove the free sulfhydryl (—SH) group. Direct sunlight, ultraviolet rays, or ionizing radiation destroys pathogens. Thermal processes and moist heat cause protein coagulation. Even though there are some problems with chlorine, it remains the agent most frequently used for wastewater disinfection, since it is relatively inexpensive, readily applied and controlled, and can be monitored by a simple and quick test.

In all of the above wastewater treatment processes, including process stages, the low foaming surfactants of the invention can be used. These low foaming surfactants reduce or eliminate foam in the wastewater, are toxicologically compatible with the environment, and are readily biodegradable. The are also essentially harmless to beneficial microorganisms used to purify or partially purify organic materials present in the wastewater.

This invention will be illustrated but not limited by the following examples.

EXAMPLES

Example 1

Preparation of the reaction product of decyl alcohol•4EO and epichlorohydrin

About 150 grams of decyl alcohol ethoxylated with an average of 4 moles of ethylene oxide (0.45 OH equivalents) were mixed with 385 grams of toluene and 54 grams of 50% aq. NaOH (0.675 equivalents). The water was removed by azeotropic distillation and when a moisture level of less than 0.8% was reached, about 46 grams (0.51 equivalents) of epichlorohydrin were slowly added. This mixture was allowed to react at 100°–110° C. for 24 hours. An aliquot of this mixture was removed and filtered to remove the NaCl and vacuum stripped to remove the toluene to give an amber, easily pourable liquid product that was dispersible in water.

Example 2

To a foaming sewage flow from a residential community, there is added 2.5% by weight of the reaction product of Example 1. The sewage foam is effectively reduced.

Example 3

Preparation of the reaction product of octyl alcohol•4EO and epichlorohydrin

About 200.0 gm (0.654 hydroxyl equivs.) of octyl alcohol ethoxylated with an average of 4 moles of ethylene oxide was mixed with 400 gm toluene and 78.4 gm (0.98 equivs.) of 50% NaOH. Water was removed by azeotropic distillation until the level was below 0.8%. The mixture was cooled to 80° C. and 67.2 gm (0.72 moles) of epichlorohydrin was added over 45 mins. The mixture was stirred for 24 hrs at 110° C. until the epoxy titration showed no epoxide left. The material was cooled, filtered and the toluene was removed by vacuum distillation leaving a dark brown low viscosity liquid.

Example 4

To a foaming wastewater flow from a chemical manufacturing plant containing sulfuric acid, there is added 1.2% by weight of the reaction product of Example 3.

The wastewater foam is significantly reduced.

What is claimed is:

1. An aqueous composition comprising:
   A) sanitary wastewater; and
   B) 0.001 to about 5%, by weight of the composition, of at least one base-catalyzed branched reaction product comprising the following reactants:
      a) at least one compound of formula I $$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and
      b) at least one compound having the formula II $$R^2X(AO)_nY \qquad (II)$$

wherein $R^2$ is a substituted or unsubstituted, saturated or unsaturated, organic group having from 1 to 36 carbon atoms; X is —O—, —S—, or —NR$^3$— where $R^3$ is hydrogen or a $C_1$–$C_{18}$ alkyl group; each AO group is independently an ethyleneoxy, 1,2-propyleneoxy, or 1,2-butyleneoxy group, n is a number of from 0 to 200; and Y is hydrogen, or Y can be a mercapto group or an amino group or a $C_1$–$C_6$ alkylamino group in place of a terminal —OH group, provided that when Y is mercapto or an amino group or a $C_1$–$C_6$ alkylamino group, n is at least 1;
      wherein the mole ratio of a) to b) is from 0.1:1 to 5:1.

2. The composition of claim 1 wherein said mole ratio is from about 0.6:1 to about 2:1.

3. The composition of claim 1 wherein said mole ratio is from about 0.8:1 to about 1.5:1.

4. The composition of claim 1 wherein the composition contains from about 0.1 to 3% by weight of the at least one base-catalyzed reaction product.

5. The composition of claim 1 wherein component B)a) in said reaction product is epichlorohydrin.

6. The composition of claim 1 wherein in formula II in said reaction product n is a number of from 1 to 100.

7. The composition of claim 6 wherein n is a number of from 2 to 20.

8. The composition of claim 7 wherein in component B)b) n is a number from 2 to 20.

9. The composition of claim 1 wherein in component B)b) in said reaction product the $R^2$ group is a straight or branched chain alkyl group.

10. The composition of claim 1 wherein component B)b) in said reaction product has the formula:

$$R^2O(EO)_m(PO)_p(BO)_qH \qquad (III)$$

wherein $R^2$ has the meaning given in claim 1, m is a number of from 0 to 100, p is a number of from 0 to 50, and q is a number of from 0 to 50.

11. The composition of claim 10 wherein component B)a) in said reaction product is epichlorohydrin.

12. The composition of claim 10 wherein the mole ratio of component B)a) to component B)b) is from about 0.6:1 to about 2:1.

13. The composition of claim 12 wherein said mole ratio is from about 1.0:1 to about 2:1.

14. The composition of claim 12 wherein said mole ratio is from about 0.8:1 to about 1.5:1.

15. The composition of claim 10 wherein m is a number of from 2 to 20.

16. The composition of claim 15 wherein p and q=0.

17. The composition of claim 10 wherein $R^2$ is an alkyl group having from 4 to 12 carbon atoms.

18. The composition of claim 17 wherein $R^2$ is a branched alkyl group.

19. The composition of claim 10 wherein $R^2$ is an alkyl group having from 4 to 12 carbon atoms, m is a number of from 4 to 50, and p and q=0.

20. The composition of claim 10 wherein component B) is present in from about 0.1 to about 3% by weight.

21. The method of claim 1 wherein in formula II in said reaction product n is a number of from 1 to 100.

22. The method of claim 21 wherein n is a number of from 2 to 20.

23. A method for treating sanitary wastewater comprising adding to wastewater 0.001 to about 5%, by weight of a composition of at least one base-catalyzed branched reaction product comprising the following reactants:

a) at least one compound of formula I $$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and b) at least one compound having the formula II $$R^2X(AO)_nY \qquad (II)$$

wherein $R^2$ is a substituted or unsubstituted, saturated or unsaturated, organic group having from 1 to 36 carbon atoms; X is —O—, —S—, or —NR$^3$— where $R^3$ is hydrogen or a $C_1$–$C_{18}$ alkyl group; each AO group is independently an ethyleneoxy, 1,2-propyleneoxy, or 1,2-butyleneoxy group, n is a number of from 0 to 200; and Y is hydrogen, or Y can be a mercapto group or an amino group or a $C_1$–$C_6$ alkylamino group in place of a terminal —OH group, provided that when Y is mercapto or an amino group or a $C_1$–$C_6$ alkylamino group, n is at least 1;

wherein the mole ratio of a) to b) is from 0.1:1 to 5:1.

24. The method of claim 23 wherein component a) in said reaction product is epichlorohydrin.

25. The method of claim 23 wherein said mole ratio is from about 0.6:1 to about 2:1.

26. The method of claim 23 wherein said mole ratio is from about 0.8:1 to about 1.5:1.

27. The method of claim 23 wherein the wastewater contains from about 0.1 to 3% by weight of the at least one base-catalyzed reaction product.

28. The method of claim 23 wherein in component b) in said reaction product the $R^2$ group is a straight or branched chain alkyl group.

29. The method of claim 28 wherein in component b) n is a number from 2 to 20.

30. The method of claim 23 wherein component b) in said reaction product has the formula:

$$R^2O(EO)_m(PO)_p(BO)_qH \qquad (III)$$

wherein $R^2$ has the meaning given in claim 1, m is a number of from 0 to 100, p is a number of from 0 to 50, and q is a number of from 0 to 50.

31. The method of claim 30 wherein $R^2$ is an alkyl group having from 4 to 12 carbon atoms.

32. The method of claim 31 wherein $R^2$ is a branched alkyl group.

33. The method of claim 30 wherein $R^2$ is an alkyl group having from 4 to 12 carbon atoms, m is a number of from 4 to 50, and p and q=0.

34. The method of claim 30 wherein component a) in said reaction product is epichlorohydrin.

35. The method of claim 30 wherein the mole ratio of component a) to component b) is from about 0.6:1 to about 2:1.

36. The method of claim 35 wherein said mole ratio is from about 1.0:1 to about 2:1.

37. The method of claim 36 wherein said mole ratio is from about 0.8:1 to about 1.5:1.

38. The method of claim 35 wherein p and q=0.

39. The method of claim 30 wherein m is a number of from 2 to 20.

40. The method of claim 30 wherein the at least one base-catalyzed reaction product is present in from about 0.1 to about 3% by weight.

* * * * *